June 20, 1961 L. G. HALL 2,988,809

FABRICATION PROCEDURE FOR PARTS HAVING LOW DENSITY CORE

Filed Oct. 8, 1956 3 Sheets-Sheet 1

INVENTOR.
LESTER G. HALL

BY Lane and Carr
ATTORNEYS

June 20, 1961 L. G. HALL 2,988,809

FABRICATION PROCEDURE FOR PARTS HAVING LOW DENSITY CORE

Filed Oct. 8, 1956 3 Sheets-Sheet 2

INVENTOR.
LESTER G HALL

BY Lane and Carr

ATTORNEYS

June 20, 1961 L. G. HALL 2,988,809

FABRICATION PROCEDURE FOR PARTS HAVING LOW DENSITY CORE

Filed Oct. 8, 1956 3 Sheets-Sheet 3

INVENTOR.
LESTER G. HALL

BY Lane and Carr

ATTORNEYS

United States Patent Office 2,988,809

Patented June 20, 1961

2,988,809
FABRICATION PROCEDURE FOR PARTS HAVING LOW DENSITY CORE

Lester G. Hall, Los Angeles, Calif., assignor to North American Aviation, Inc.

Filed Oct. 8, 1956, Ser. No. 614,423
3 Claims. (Cl. 29—423)

This invention pertains to a fabrication procedure for parts having a low density core, and more particularly to the construction of assemblies having honeycomb core faced by sheets on either side.

Difficulty has been encountered in obtaining honeycomb sandwish assemblies having a strong attachment between the components of the assembly, as well as a precision contour. It has been particularly troublesome to shape accurately the elements of the assembly and to match these members properly so that a void-free bond and exact configuration could be obtained. This has been especially true of contoured parts which have a curvature in one or two directions, yet must be held within close tolerances. The honeycomb core material may be made of thin foil which is difficult to hold for a machining operation and is not readily formable to exact shapes.

Figure 1:
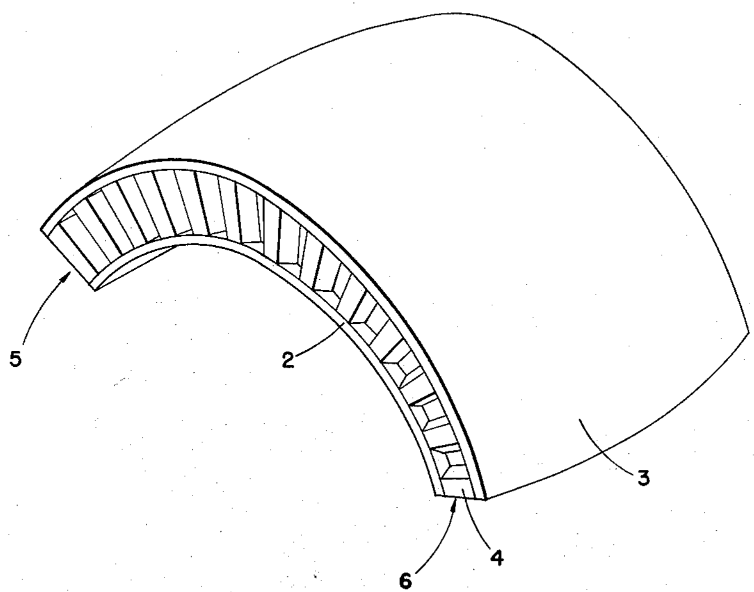
Figure 2:
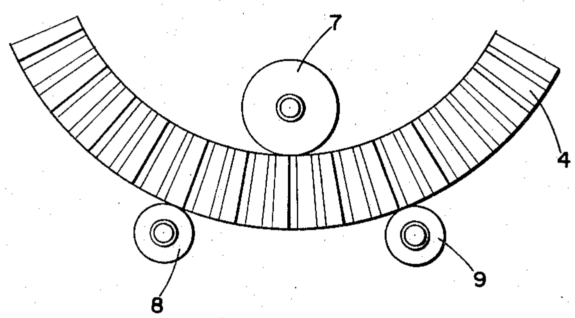
Figure 3:
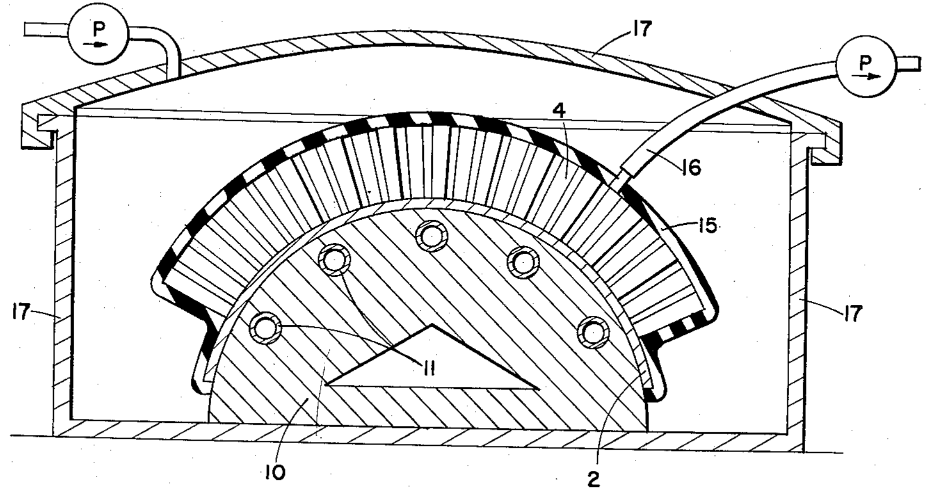
Figure 4:
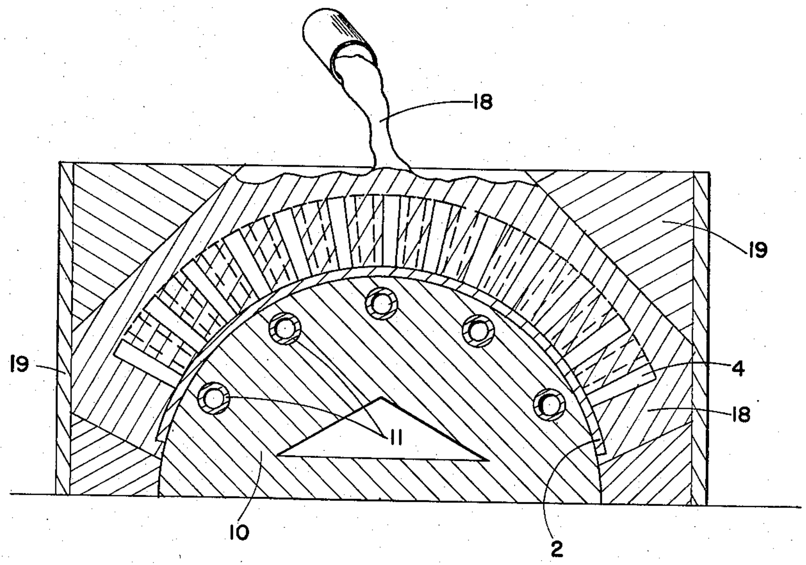
Figure 5:
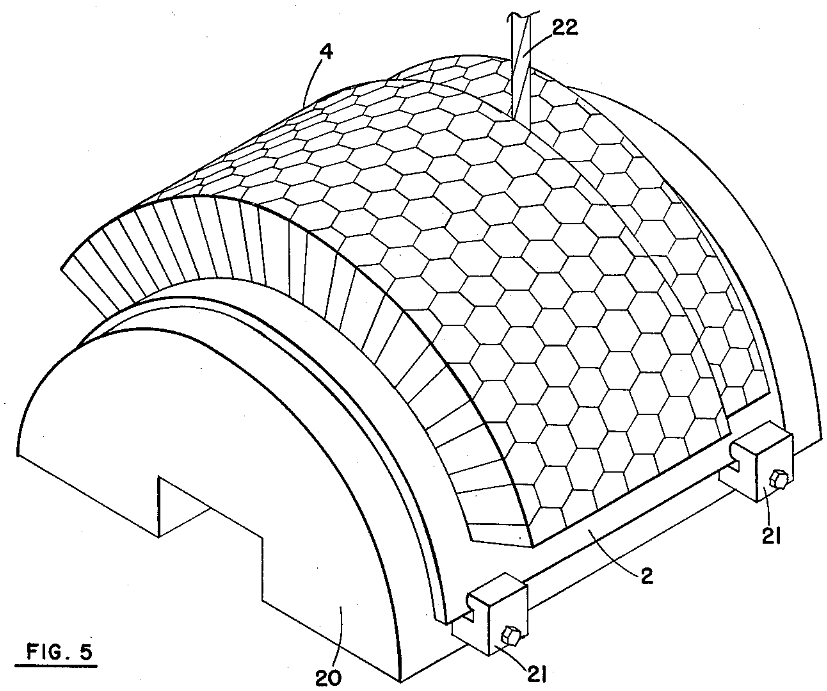
Figure 6:
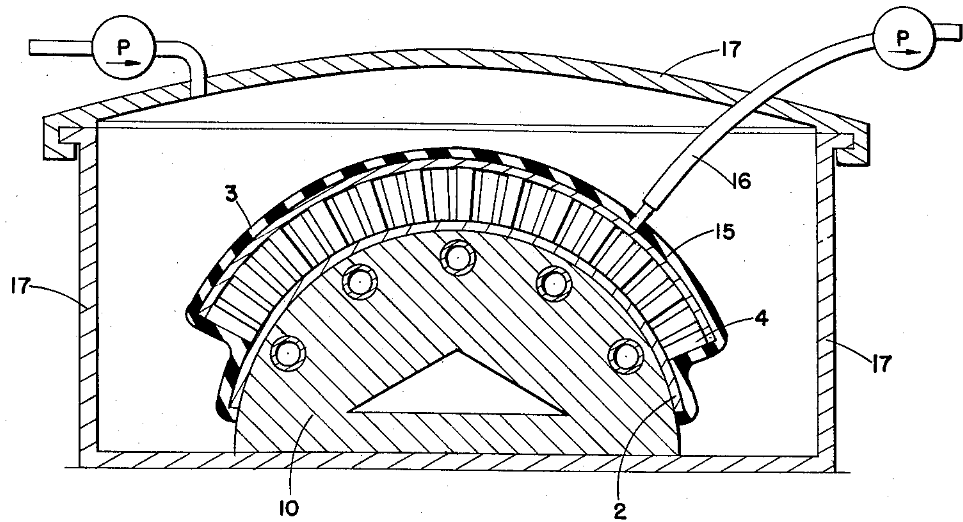

According to the provisions of this invention, a simplified procedure is followed resulting in extreme accuracy of the completed honeycomb assembly. Generally speaking, this involves bending the honeycomb core material to the general shape required, attaching the core on one side to one pre-contoured sheet member, gripping the assembly in a suitable manner for a machining operation on the opposite surface of the honeycomb core, and subsequently attaching the other sheet member to the opposite side of the core. The attachment to one skin member prior to machining assures accuracy of results. Thus the object of this invention is to provide a simplified procedure whereby low density core assemblies may be fabricated to a high degree of accuracy with a strong attachment between the components of the assembly. This and other objects will become apparent from the following detailed description taken in connection with the accompanying drawing in which:

FIG. 1 is a perspective view of an assembly completed by the teaching of this invention, FIG. 2 is a side elevational view of the forming of the low density core, FIG. 3 is a sectional view of the core being bonded to the inner skin, FIG. 4 is a sectional view showing the rigidizing material being added to the core, FIG. 5 is a perspective view of the machining of the outer surface of the core, and FIG. 6 is a sectional view of the outer skin being bonded to the core.

Referring to FIG. 1 of the drawings a typical part to be formed according to the provision of this invention is illustrated. Part 1 includes an inner sheet member 2 and an outer sheet member 3 separated by a low density honeycomb core 4. The part is curved in two directions having a relatively sharp curvature transversely and a lesser curvature longitudinally. The sheet members may be of relatively thin aluminum and the core may be of aluminum foil of .004 inch thickness. The requirements of part 1 may be such that the spacing is not uniform between the two sheet members including, for example, a greater thickness at 5 than at tapering section 6. The assembly may be bonded, brazed or otherwise suitably secured together. The difficulties which will be encountered from matching the three parts and shaping the honeycomb in a conventional manner to the necessary contour are apparent.

According to the provisions of this invention, inner skin 2 is formed to its required shape in any suitable manner. This may be by stretch forming or other means by which an accurate shape is easily obtained. Preferably an excess of material is left at the marginal portions of this sheet member.

The honeycomb core is separately given its general contour by suitable means such as roll forming. Thus the ordinary expanded honeycomb, having a thickness greater than that required for the completed part, is passed through rollers 7, 8 and 9 (see FIG. 2) which will give it a curvature in one direction substantially corresponding to the transverse curvature required for the finished core in the completed assembly.

A bonding jig 10 shown in FIG. 3, is also provided having a contour complementary to the inside surface of skin 2. This jig preferably includes coils 11 which are used for heating and cooling as more fully brought forth below. Skin 2 is located on the bonding jig and core 4 is positioned over the exposed surface of skin 2 with its convex surface adjacent thereto. Cement is disposed between the adjacent surfaces of the honeycomb core and skin 2. The honeycomb is urged into intimate contact with all portions of the skin and bonded thereto by curing the cement. The low density core material of aluminum foil or similar material may be deflected by hand to assume the curvature in a longitudinal direction corresponding to the curvature of skin 1, which is less severe than the transverse curvature. A typical bonding procedure is to dispose a membrane 15 over the top of the core material and the skin sealing around the edges with zinc chromate. The membrane may be of polyvinyl alcohol, thus being air tight. By suitable outlet 16 the air beneath the membrane is evacuated to apply pressure forcing the core into firm engagement with the part. At the same time the assembly may be disposed in a pressurized autoclave 17 into which air pressure is introduced providing a further force to hold the core on the inner skin. While this occurs steam is circulated through coils 11 heating the assembly so as to cure the cement.

After the core material is bonded to the inner skin it is removed from the autoclave and the pressure membrane also is removed. At this time the bond between the inner skin and the core may be visually inspected to assure that a strong attachment is obtained. This check is impossible with conventional fabriaction procedures. As illustrated in FIG. 4 the honeycomb core is then filled with a rigidizing material 18 preparatory to machining the exposed end thereof. The rigidizing material is to prevent collapsing and distortion of the thin foil honeycomb during the machining operation, but of course does not interfere with the cutter accomplishing the machining. Several materials of this sort are on the market, one of these bing known as 40N498 filler material produced by National Adhesives Division of National Starch Products, Inc., 268 Madison Ave., New York 16, New York.

In applying this material it is melted at approximately 230° F. and the bonding jig is brought to this temperature by circulation of steam through coils 11. The rigidizing material is then poured into the open cells of the honeycomb and is held at temperature long enough to permit escape of air bubbles from this material. Deflectors 19 retain the filler material around the core. After this cold water is run through coils 11 hardening the filler material, and the excess filler is removed.

The assembled rigidized core and skin are then removed and placed on a holding fixture 20, clamped in place by suitable means 21 for the machining operation shown in FIG. 5. It is possible in this manner to fix the honeycomb for machining by engagement with the skin to which the core is attached. A cutter 22 is then utilized to shape the exposed side of the honeycomb to the desired finished contour. The thin foil walls of the core will not be collapsed or otherwise distorted by the cutter because of the rigidizing material in the core. After this the rigidizing material is melted by heating and removed from the core, and the core is cleaned to remove all traces of such matter. The exposed end of the core will have a precision contour correlated to the contour of the inner skin member.

Skin 3 is shaped to the finished contour as was skin 2, again by any suitable means such as stretch forming. Skin 3 is thereby made complementary to the exposed surface of the honeycomb core. Thereafter skin 3 is located over this exposed surface with cement interposed between the two members. By applying heat and pressure as previously described for the attachment of the core to skin 2 and as shown in FIG. 6, the core and skin 3 are then assembled together. After trimming off any excess material, the honeycomb assembly is complete.

Thus by utilizing the partial assembly of the inner skin plus the core a suitable holding fixture is obtained for providing means to position a core for the machining operation. The fact that the core is at that time attached to the inner skin member means that the exact thickness and contour of the exposed surface may be accurately obtained. No difficulty from spring back or distortion of the core is encountered. The result is a honeycomb assembly which may be held to minute tolerances while producing a part of superior quality with a firm void-free bond throughout the portions attached together.

I claim:

1. The method of fabricating a contoured honeycomb assembly of difficult-to-machine thin-walled core having a compound curvature comprising the steps of shaping a sheet member to a compound curvature, roll forming a honeycomb segment to a contour approximating the contour of said sheet, bonding said honeycomb segment to said sheet while urging said honeycomb segment into intimate contact with said sheet by disposing an airtight membrane over said honeycomb segment and said sheet and evacuating the air from beneath said membrane, then filling said honeycomb segment with a rigidizing material by pouring molten rigidizing material into the exposed side of said honeycomb segment, solidifying said molten rigidizing material, then machining said exposed side of said honeycomb segment to a predetermined contour while positioning said honeycomb segment by engaging said sheet, then melting and removing said rigidizing material, then forming a second sheet to a contour complementary to the contour of said side of said honeycomb segment, and bonding said second sheet to said side of said honeycomb segment while urging said second sheet against said side by disposing an airtight membrane over said second sheet and said honeycomb segment and evacuating the air from beneath said membrane.

2. The method of fabricating a contoured honeycomb sandwich assembly of difficult-to-machine thin-walled core in which the core is nonuniform in thickness comprising the steps of providing a first sheet member of a predetermined contour, bonding one side of a honeycomb segment to said first sheet member, filling said honeycomb segment with a rigidizing material, holding said first sheet member while machining the opposite side of said honeycomb segment to an arcuate contour differing from the predetermined contour of said first sheet member so that said honeycomb segment is machined to a nonuniform thickness, removing said rigidizing material after said machining, forming a second sheet member complementary to the arcuate contour of the machine opposite side of said honeycomb segment, and bonding said second sheet member to the machined opposite side of said honeycomb segment to provide a bonded honeycomb sandwich panel of nonuniform thickness.

3. The method of fabricating a contoured honeycomb assembly of difficult-to-machine thin-walled core having a compound curvature comprising the steps of shaping a sheet member to a compound curvature, roll forming a honeycomb segment to a contour approximating the contour of said sheet, bonding said honeycomb segment to said sheet while urging said honeycomb segment into intimate contact with the sheet, filling said honeycomb segment with a molten rigidizing material, solidifying said molten rigidizing material, machining the exposed side of said honeycomb segment to a predetermined contour while positioning said honeycomb segment by engaging said sheet, melting and removing said rigidizing material, forming a second sheet to a contour complementary to the contour of the exposed side of said honeycomb segment, and bonding said second sheet to the exposed side of said honeycomb segment.

References Cited in the file of this patent

UNITED STATES PATENTS

| | | |
|---|---|---|
| 1,984,007 | Babbit | Dec. 11, 1934 |
| 2,167,215 | Leary | July 25, 1939 |
| 2,586,532 | Granfield | Feb. 19, 1952 |
| 2,609,068 | Pajak | Sept. 2, 1952 |
| 2,644,777 | Havens | July 7, 1953 |
| 2,663,928 | Wheeler | Dec. 29, 1953 |
| 2,700,632 | Ackerlind | Jan. 25, 1955 |
| 2,731,713 | Schaefer | Jan. 24, 1956 |
| 2,810,816 | Hardesty | Oct. 22, 1957 |
| 2,855,664 | Griffith et al. | Oct. 14, 1958 |